US011071119B2

United States Patent
Inokuchi et al.

(10) Patent No.: US 11,071,119 B2
(45) Date of Patent: Jul. 20, 2021

(54) APPARATUS FOR CONTROLLING DEVICE-TO-DEVICE COMMUNICATION, BASE STATION, RADIO TERMINAL, AND METHOD THEREFOR

(71) Applicant: NEC CORPORATION, Tokyo (JP)

(72) Inventors: Masaki Inokuchi, Tokyo (JP); Kazushi Muraoka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 344 days.

(21) Appl. No.: 16/086,183

(22) PCT Filed: Jan. 12, 2017

(86) PCT No.: PCT/JP2017/000755
§ 371 (c)(1),
(2) Date: Sep. 18, 2018

(87) PCT Pub. No.: WO2017/163544
PCT Pub. Date: Sep. 28, 2017

(65) Prior Publication Data
US 2020/0305165 A1 Sep. 24, 2020

(30) Foreign Application Priority Data
Mar. 23, 2016 (JP) .............................. JP2016-058488

(51) Int. Cl.
*H04W 72/04* (2009.01)
*H04W 92/18* (2009.01)
(52) U.S. Cl.
CPC ........ *H04W 72/0486* (2013.01); *H04W 92/18* (2013.01)

(58) Field of Classification Search
CPC ..... H04W 88/04; H04W 92/18; H04W 76/14; H04W 28/0278; H04W 4/70; H04W 72/02; H04W 72/1278; H04W 72/1268
See application file for complete search history.

(56) References Cited

U.S. PATENT DOCUMENTS

| 8,462,743 B2 * | 6/2013 | Kovacs ................. H04L 47/722 370/338 |
| 10,187,810 B1 * | 1/2019 | Liu .................... H04W 72/1263 |

(Continued)

FOREIGN PATENT DOCUMENTS

| JP | 2011-097340 A | 5/2011 |
| JP | 2013-030908 A | 2/2013 |

(Continued)

OTHER PUBLICATIONS

"3rd Generation Partnership Project; Technical Specification Group Services and System Aspects; Proximity-based services (ProSe); Stage 2 (Release 12)", 3GPP TS 23.303 V12.7.0, Dec. 2015, pp. 1-58.

(Continued)

*Primary Examiner* — Dung Hong
(74) *Attorney, Agent, or Firm* — Sughrue Mion, PLLC (57) ABSTRACT

An apparatus (1 or 3) adjusts a bandwidth, throughput, or radio resource used for device-to-device (D2D) transmission from a remote terminal (1) to a relay terminal (2), based on an amount of pending uplink data in the relay terminal (2) to be transmitted from the relay terminal (2) to a base station (3). In this way, for example, it is possible to contribute to avoiding inconsistency of performance between sidelink transmission from the remote terminal to the relay terminal and uplink transmission from the relay terminal to the base station.

15 Claims, 7 Drawing Sheets

(56) References Cited

U.S. PATENT DOCUMENTS

| | | | | |
|---|---|---|---|---|
| 2010/0302946 | A1* | 12/2010 | Yang | H04L 47/30 370/235 |
| 2011/0261747 | A1* | 10/2011 | Wang | H04B 7/155 370/315 |
| 2011/0269393 | A1* | 11/2011 | Ostergaard | H04W 72/1284 455/7 |
| 2011/0310814 | A1* | 12/2011 | Callard | H04W 72/1252 370/329 |
| 2012/0044814 | A1* | 2/2012 | Natarajan | H04L 47/30 370/246 |
| 2012/0094682 | A1 | 4/2012 | Ode et al. | |
| 2014/0192638 | A1* | 7/2014 | Taneja | H04W 28/0268 370/229 |
| 2014/0254471 | A1* | 9/2014 | Fang | H04W 84/047 370/315 |
| 2016/0135171 | A1* | 5/2016 | Korhonen | H04W 72/04 370/329 |
| 2016/0227518 | A1* | 8/2016 | Li | H04W 76/14 |
| 2016/0242144 | A1* | 8/2016 | Adachi | H04W 4/06 |
| 2016/0338094 | A1* | 11/2016 | Faurie | H04W 72/14 |
| 2016/0338095 | A1* | 11/2016 | Faurie | H04W 28/0278 |
| 2017/0093541 | A1* | 3/2017 | Pan | H04W 76/14 |
| 2017/0244474 | A1* | 8/2017 | Ijaz | H04B 7/2606 |
| 2017/0325243 | A1* | 11/2017 | Yasukawa | H04W 88/04 |
| 2018/0027429 | A1* | 1/2018 | Li | H04W 24/02 455/426.1 |
| 2018/0049260 | A1* | 2/2018 | Aminaka | H04W 72/048 |
| 2018/0054755 | A1* | 2/2018 | Lee | H04W 28/0278 |
| 2018/0069618 | A1* | 3/2018 | Loehr | H04W 72/1263 |
| 2018/0317210 | A1* | 11/2018 | Zhang | H04L 5/0053 |
| 2019/0053215 | A1* | 2/2019 | Yu | H04W 28/0268 |

FOREIGN PATENT DOCUMENTS

| | | |
|---|---|---|
| JP | 2013-524643 A | 6/2013 |
| WO | 2011/007388 A1 | 1/2011 |
| WO | 2015/046155 A1 | 4/2015 |

OTHER PUBLICATIONS

"3rd Generation Partnership Project; Technical Specification Group Radio Access Network; Evolved Universal Terrestrial Radio Access (E-UTRA); Physical layer procedures (Release 12)", 3GPP TS 36.213 V12.5.0, Mar. 2015, pp. 1-239.

"3rd Generation Partnership Project; Technical Specification Group Services and System Aspects; Study on extended architecture support for proximity-based services (Release 13)", 3GPP TR 23.713 V13.0.0, Sep. 2019, pp. 1-80.

Qualcomm Incorporated, "Support of UE-Network relays," 3GPP TSG-RAN WG1 #81, R1-152778, May 25-19, 2015, pp. 1-10, Fukuoka, Japan.

Qualcomm Incorporated, "UE-to-Network Relay conclusions", SA WG2 Meeting #108, S2-150925, Apr. 13-17, 2015, pp. 1-4, San Jose Del Cabo, Mexico.

Sony, "Discussion on UE-to-Network Relay measurement", 3GPP TSG RAN WG1 Meeting #81, R1-153087, May 25-29, 2015, 4 pgs., Fukuoka, Japan.

Qualcomm Incorporated, "Role of eNB when remote UE is in coverage", 3GPP TSG-RAN WG2 Meeting #90, R2-152560, May 25-29, 2015, 5 pgs., Fukuoka, Japan.

NTT Docomo, "Views on UE-to-Network Relay Discovery", 3GPP TSG RAN WG1 Meeting #80bis, R1-151965, Apr. 20-24, 2015, pp. 1-6, Belgrade, Serbia.

NTT Docomo, "Discussion on Relay Selection", 3GPP TSG RAN WG1 Meeting #81, R1-153188, May 25-29, 2015, pp. 1-4, Fukuoka, Japan.

CoolPad, "Further Discussion on Resource Allocation Issues and Way Forward for Release 13", 3GPP TSG-RAN WG2 #91 bis, R2-154269, Oct. 5-10, 2015, pp. 1-4, Malmö, Sweden.

Kyocera, "Resource allocation schemes for D2D communication", 3GPP TSG-RAN WG2 #84, R2-134311, Nov. 11-15, 2013, pp. 1-11, San Francisco, USA.

International Search Report for PCT/JP2017/000755 dated Mar. 21, 2017 (PCT/ISA/210).

* cited by examiner

APPARATUS FOR CONTROLLING DEVICE-TO-DEVICE COMMUNICATION, BASE STATION, RADIO TERMINAL, AND METHOD THEREFOR

CROSS REFERENCE TO RELATED APPLICATIONS

This application is a National Stage of International Application No. PCT/JP2017/000755 filed Jan. 12, 2017, claiming priority based on Japanese Patent Application No. 2016-058488, filed Mar. 23, 2016, the disclosure of which is incorporated herein in its entirety by reference.

TECHNICAL FIELD

The present disclosure relates to inter-terminal direct communication (i.e., device-to-device (D2D) communication) and, in particular, to control of sidelink transmission from a remote terminal to a relay terminal.

BACKGROUND ART

A type of communication in which e a wireless terminal directly communicates with another wireless terminal without going through an infrastructure network such as a base station is called device-to-device (D2D) communication. The D2D communication includes at least one of Direct Communication and Direct Discovery. In some implementations, a plurality of wireless terminals supporting D2D communication form a D2D communication group autonomously or under the control of a network, and communicate with another wireless terminal in the formed D2D communication group.

Proximity-based services (ProSe) specified in 3GPP Release 12 is one example of the D2D communication (see, for example, Non Patent Literature 1). ProSe Direct Discovery is performed through a procedure in which a wireless terminal capable of performing ProSe (i.e., ProSe-enabled User Equipment (UE)) discovers another ProSe-enabled UE only by using the capability of a radio communication technology (e.g., Evolved Universal Terrestrial Radio Access (E-UTRA) technology) of those two UEs. ProSe Direct Discovery may be performed by three or more ProSe-enabled UEs.

ProSe Direct Communication enables establishment of a communication path between two or more ProSe-enabled UEs existing in a direct communication range after the ProSe Direct Discovery procedure is performed. Stated differently, ProSe Direct Communication enables a ProSe-enabled UE to directly communicate with another ProSe-enabled UE without going through a Public Land Mobile Network (PLMN)) including a base station (eNodeB (eNB)). ProSe Direct Communication may be performed by using a radio communication technology (i.e., E-UTRA technology) that is also used to access a base station (eNB) or by using a Wireless Local Area Network (WLAN) radio technology (i.e., IEEE 802.11 radio technology).

In 3GPP Release 12, a radio link between wireless terminals used for Direct Communication or Direct Discovery is referred to as a Sidelink (see, for example, Section 14 in Non Patent Literature 2). Sidelink transmission uses the Long Term Evolution (LTE) frame structure defined for uplink and downlink and uses a subset of uplink resources in frequency and time domains. A wireless terminal (i.e., UE) performs sidelink transmission by using Single Carrier FDMA (Frequency Division Multiple Access) (SC-FDMA), which is the same as used in uplink.

In 3GPP Release 12 ProSe, allocation of radio resources to a UE for sidelink transmission is performed by a radio access network (e.g., Evolved Universal Terrestrial Radio Access Network (E-UTRAN)). A UE that has been permitted to perform sidelink communication by a ProSe function performs ProSe Direct Discovery or ProSe Direct Communication by using radio resources allocated by a radio access network node (e.g., eNB (eNB)).

As for ProSe Direct Communication, two resource allocation modes, i.e., scheduled resource allocation and autonomous resource selection, are defined. The scheduled resource allocation and the autonomous resource selection are referred to as "sidelink transmission mode 1" and "sidelink transmission mode 2", respectively (see Section 14 in Non Patent Literature 2).

In the scheduled resource allocation for ProSe Direct Communication, when a UE desires to perform sidelink transmission, this UE requests an eNB to allocate radio resources for sidelink transmission, and the eNB allocates resources for sidelink control and data to the UE. To be specific, a UE transmits to an eNB a scheduling request to request an uplink (UL) data transmission resource (i.e., Uplink Shared Channel (UL-SCH) resource) and then transmits a Sidelink Buffer Status Report (Sidelink BSR) to the eNB by using an UL data transmission resource allocated by an uplink grant (UL grant). The eNB determines sidelink transmission resources to be allocated to the UE based on the Sidelink BSR and transmits a sidelink grant (SL grant) to the UE.

The SL grant is defined as Downlink Control Information (DCI) format 5. The SL grant (i.e., DCI format 5) contains contents such as a Resource for PSCCH, Resource block assignment and hopping allocation, and a time resource pattern index. The Resource for PSCCH indicates radio resources for a sidelink control channel (i.e., Physical Sidelink Control Channel (PSCCH)). The Resource block assignment and hopping allocation is used to determine frequency resources, i.e., a set of subcarriers (resource blocks), for transmitting a sidelink data channel (i.e., Physical Sidelink Shared Channel (PSSCH)) for sidelink data transmission. The Time resource pattern index is used to determine time resources, i.e., a set of subframes, for transmitting the PSSCH. Note that, strictly speaking, the resource block means time-frequency resources in LTE and LTE-Advanced and is a unit of resources specified by consecutive OFDM (or SC-FDMA) symbols in the time domain and consecutive subcarriers in the frequency domain. In the case of Normal cyclic prefix, one resource block includes 12 consecutive OFDM (or SC-FDMA) symbols in the time domain and 12 subcarriers in the frequency domain. That is, the Resource block assignment and hopping allocation and the Time resource pattern index designate a resource block for transmitting the PSSCH. The UE (i.e., a sidelink transmission terminal) determines a PSCCH resource and a PSSCH resource according to the SL grant.

On the other hand, in the autonomous resource selection for ProSe Direct Communication, a UE autonomously selects resources for sidelink control (i.e., PSCCH) and data (i.e., PSSCH) from a resource pool(s) set by an eNB. The eNB may allocate a resource pool(s) for the autonomous resource selection to the UE in a System Information Block (SIB) 18. The eNB may allocate a resource pool for the autonomous resource selection to the UE in Radio Resource Control (RRC)_CONNECTED by dedicated RRC signaling. This resource pool may be usable also when the UE is in RRC_IDLE.

When direct transmission is performed on a sidelink, a UE on a transmitting side (i.e., a D2D transmitting UE) (hereinafter referred to as a transmitting terminal) transmits Scheduling Assignment information by using a portion of radio resources (i.e., resource pool) for a sidelink control channel (i.e., PSCCH). The scheduling assignment information is also referred to as Sidelink Control Information (SCI) format 0. The scheduling assignment information includes contents such as resource block assignment and hopping allocation, a time resource pattern index, and a Modulation and Coding Scheme (MCS). In the case of the above-described scheduled resource allocation, the Resource block assignment and hopping allocation and the time resource pattern index indicated by the Scheduling Assignment (i.e., SCI format 0) follow the Resource block assignment and hopping allocation and the time resource pattern index indicated by the SL grant (i.e., DCI format 5) received from the eNB.

The transmitting terminal transmits data on the PSSCH by using a radio resource according to the scheduling assignment information. A UE on a receiving side (i.e., a D2D receiving UE) (hereinafter referred to as a receiving terminal) receives the scheduling assignment information from the transmitting terminal on the PSCCH and receives the data on the PSSCH according to the received scheduling assignment information. Note that the term "transmitting terminal" just focuses on a transmission operation of a wireless terminal and does not mean a radio terminal dedicated for transmission. Similarly, the term "receiving terminal" is an expression for expressing a receiving operation of a wireless terminal and does not mean a wireless terminal dedicated for reception. That is, the transmitting terminal is able to perform a receiving operation and the receiving terminal is able to perform a transmitting operation.

3GPP Release 12 further defines a partial coverage scenario where one UE is located outside the network coverage and another UE is located within the network coverage (see, for example, Sections 4.4.3, 4.5.4 and 5.4.4 of Non-Patent Literature 1). In the partial coverage scenario, the UE outside the coverage is referred to as a "remote UE" or a "sidelink remote UE", and the UE that is in coverage and performs relaying between the remote UE and the network is referred to as a "ProSe UE-to-Network Relay" or a "sidelink relay UE". The ProSe UE-to-Network Relay relays traffic (downlink and uplink) between the remote UE and the network (E-UTRA network (E-UTRAN) and EPC).

More specifically, the ProSe UE-to-Network Relay attaches to the network as a UE, establishes a PDN connection to communicate with a ProSe function entity or another Packet Data Network (PDN), and communicates with the ProSe function entity to start ProSe direct communication. The ProSe UE-to-Network Relay further performs the discovery procedure with the remote UE, communicates with the remote UE on the inter-UE direct interface (e.g., sidelink or PC5 interface), and relays traffic (downlink and uplink) between the remote UE and the network. When the Internet Protocol version 4 (IPv4) is used, the ProSe UE-to-Network Relay operates as a Dynamic Host Configuration Protocol Version 4 (DHCPv4) Server and Network Address Translation (NAT). When the IPv6 is used, the ProSe UE-to-Network Relay operates as a stateless DHCPv6 Relay Agent.

Further, in 3GPP Release 13, extensions of ProSe have been discussed (see, for example, Non-patent Literatures 3 to 9). This discussion includes a discussion about relay selection criteria for selecting a ProSe UE-to-Network Relay and a ProSe UE-to-UE Relay and a discussion about a relay selection procedure including arrangement of a relay selection. Note that the ProSe UE-to-UE Relay is a UE that relays traffic between two remote UEs.

Regarding the arrangement of the relay selection for the UE-to-Network Relay, a distributed relay selection architecture in which a remote UE selects a relay (see, for example, Non-patent Literatures 4-6, 8 and 9) and a centralized relay selection architecture in which an element in a network such as a base station (i.e., eNodeB (eNB)) selects a relay (see, for example, Non-patent Literatures 7 and 8) have been proposed. Regarding the criteria for the relay selection for the UE-to-Network Relay, it has been proposed to consider D2D link quality between a remote UE and a relay UE, consider backhaul link quality between a relay UE and an eNB, and consider both the D2D link quality and the backhaul link quality (see, for example, Non-patent Literatures 4 to 9).

In the specification, a radio terminal having the D2D communication capability and the relay capability, such as the ProSe UE-to-Network Relay (the sidelink relay UE), is referred to as a "relay terminal" or a "relay UE". Further, a radio terminal that receives a relay service provided by a relay UE is referred to as a "remote terminal" or a "remote UE". The remote terminal may also be referred to as a "relayed terminal".

CITATION LIST

Non Patent Literature

Non-patent Literature 1: 3GPP TS 23.303 V12.7.0 (2015-12), "3rd Generation Partnership Project; Technical Specification Group Services and System Aspects; Proximity-based services (ProSe); Stage 2 (Release 12)", December 2015

Non-patent Literature 2: 3GPP TS 36.213 V12.5.0 (2015-03), "3rd Generation Partnership Project; Technical Specification Group Radio Access Network; Evolved Universal Terrestrial Radio Access (E-UTRA); Physical layer procedures (Release 12)", March 2015

Non-patent Literature 3: 3GPP TR 23.713 V13.0.0 (2015-09), "3rd Generation Partnership Project; Technical Specification Group Services and System Aspects; Study on extended architecture support for proximity-based services (Release 13)", September 2015

Non-patent Literature 4: 3GPP R1-152778, "Support of UE-Network relays", Qualcomm Incorporated, May 2015

Non-patent Literature 5: 3GPP S2-150925, "UE-to-Network Relay conclusions", Qualcomm Incorporated, April 2015

Non-patent Literature 6: 3GPP R1-153087, "Discussion on UE-to-Network Relay measurement", Sony, May 2015

Non-patent Literature 7: 3GPP R2-152560, "Role of eNB when remote UE is in coverage", Qualcomm Incorporated, May 2015

Non-patent Literature 8: 3GPP R1-151965, "Views on UE-to-Network Relay Discovery", NTT DOCOMO, April 2015

Non-patent Literature 9: 3GPP R1-153188, "Discussion on Relay Selection", NTT DOCOMO, May 2015

SUMMARY OF INVENTION

Technical Problem

The aforementioned Non-patent Literatures do not describe that an amount of pending uplink data in a relay UE to be transmitted from the relay UE to an eNB is not taken into consideration when a radio resource for sidelink transmission from a remote UE to the relay UE is determined or adjusted. For example, when there is inconsistency of performance (e.g., bandwidth or throughput) between sidelink transmission from the remote UE to the relay UE and uplink transmission from the relay UE to the eNB, it could cause an overflow in an uplink transmission buffer in the relay UE. The uplink transmission buffer is used to store data to be transmitted through an uplink. Further, there is a possibility that a significant increase in an occupation level of the uplink transmission buffer may be caused by excessive allocation of radio resources to the sidelink transmission from the remote UE to the relay UE. Allocation of radio resources to the sidelink transmission from the remote UE to the relay UE which provides an excessive sidelink throughput larger than an uplink throughput of the relay UE could cause a waste of sidelink radio resources.

One of the objects to be attained by embodiments disclosed herein is to provide an apparatus, a method, and a program that contribute to avoiding inconsistency of performance (e.g., bandwidth or throughput) between sidelink transmission from a remote terminal to a relay terminal and uplink transmission from the relay terminal to a base station. It should be noted that the above-described object is merely one of the objects to be attained by the embodiments disclosed herein. Other objects or problems and novel features will be made apparent from the following description and the accompanying drawings.

Solution to Problem

In a first aspect, an apparatus for controlling device-to-device communication includes a memory and at least one processor coupled to the memory. The at least one processor is configured to adjust a bandwidth, throughput, or radio resource used for device-to-device (D2D) transmission from a remote terminal to a relay terminal based on an amount of pending uplink data in the relay terminal to be transmitted from the relay terminal to a base station.

In a second aspect, a method for controlling device-to-device communication includes adjusting a bandwidth, throughput, or radio resource used for device-to-device (D2D) transmission from a remote terminal to a relay terminal based on an amount of pending uplink data in the relay terminal to be transmitted from the relay terminal to a base station.

In a third aspect, a base station includes a memory and at least one processor coupled to the memory. The at least one processor is configured to transmit, to a remote terminal, control information generated based on a buffer status of an uplink transmission buffer that is configured to store pending uplink data in a relay terminal to be transmitted from the relay terminal to the base station.

In a fourth aspect, a method performed in a base station includes (a) acquiring a buffer status of an uplink transmission buffer that is configured to store pending uplink data in a relay terminal to be transmitted from the relay terminal to the base station, and (b) transmitting, to a remote terminal, control information generated based on the buffer status.

In a fifth aspect, a relay terminal includes a memory and at least one processor coupled to the memory. The at least one processor is configured to transmit, to a remote terminal, control information generated based on a buffer status of an uplink transmission buffer that is configured to store pending uplink data in the relay terminal to be transmitted from the relay terminal to a base station.

In a sixth aspect, a method performed in a relay terminal includes (a) acquiring a buffer status of an uplink transmission buffer configured to store pending uplink data in the relay terminal to be transmitted from the relay terminal to a base station, and (b) transmitting, to a remote terminal, control information generated based on the buffer status.

In a seventh aspect, a remote terminal includes a memory and at least one processor coupled to the memory. The at least one processor is configured to receive, from a remote terminal or a base station, control information generated based on a buffer status of an uplink transmission buffer that is configured to store pending uplink data in the relay terminal to be transmitted from the relay terminal to the base station.

In an eighth aspect, a method performed in a remote terminal includes receiving, from a remote terminal or a base station, control information generated based on a buffer status of an uplink transmission buffer from the remote terminal or a base station that is configured to store pending uplink data in the relay terminal to be transmitted from the relay terminal to the base station.

In a ninth aspect, a program includes a set of instructions (software codes) that, when loaded into a computer, causes the computer to perform a method according to the above-described second, fourth, sixth, or eighth aspect.

Advantageous Effects of Invention

According to the above-described aspects, it is possible to provide an apparatus, a method, and a program that contribute to avoiding inconsistency of performance (e.g., bandwidth or throughput) between sidelink transmission from a remote terminal to a relay terminal and uplink transmission from the relay terminal to a base station.

DESCRIPTION OF EMBODIMENTS

Specific embodiments will be described hereinafter in detail with reference to the drawings. The same or corresponding elements are denoted by the same symbols throughout the drawings, and duplicated explanations are omitted as necessary for the sake of clarity.

Each of the embodiments described below may be used individually, or two or more of the embodiments may be appropriately combined with one another. These embodiments include novel features different from each other. Accordingly, these embodiments contribute to attaining objects or solving problems different from one another and also contribute to obtaining advantages different from one another.

The following embodiments will be described on the assumption that they are implemented to 3GPP ProSe. However, these embodiments are not limited to the LTE-Advanced and its improvements and may also be applied to D2D communication in other mobile communication networks or systems.

First Embodiment

Figure 1:
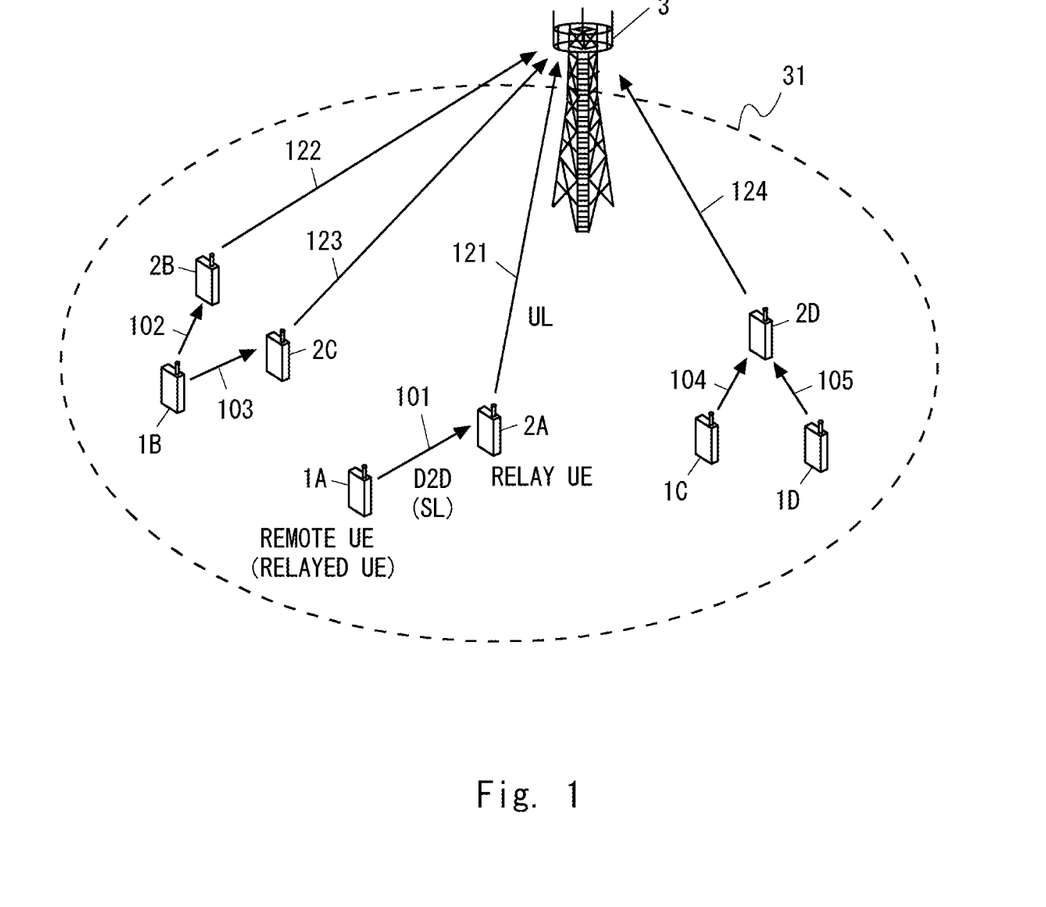
FIG. 1 is a diagram showing a configuration example of a radio communication network according to some embodiments.

FIG. 1 shows a configuration example of a radio communication network according to some embodiments including this embodiment. Specifically, FIG. 1 shows an example related to a UE-to-Network Relay (i.e., sidelink relay UE) and shows a plurality of remote UEs 1A, 1B, 1C and 1D, and a plurality of relay UEs 2A, 2B, 2C and 2D. In the following description, when matters common to a plurality of remote UEs including the remote UEs 1A, 1B, 1C and 1D are described, they are simply referred to as the "remote UE 1" by using a reference numeral "1". Similarly, when matters common to a plurality of relay UEs including the relay UEs 2A, 2B, 2C and 2D are described, they are simply referred to as the "relay UE 2" by using a reference numeral "2".

The remote UE 1 includes at least one radio transceiver and is configured to perform D2D communication with one or more relay UEs 2 on one or more D2D links (e.g., D2D link 101). As already described, the D2D link is referred to as a PC5 interface or a sidelink in the 3GPP. The D2D communication includes at least direct communication (i.e., ProSe Direct Communication) and may further include direct discovery (i.e., ProSe Direct Discovery). The ProSe Direct Communication is direct communication using sidelink transmission and is also referred to as Sidelink Direct Communication. Similarly, the ProSe Direct Discovery is direct discovery using sidelink transmission and is also referred to as Sidelink Direct Discovery. Further, the remote UE 1 is configured to perform cellular communication in a cellular coverage (i.e., cell) 31 provided by a base station (i.e., eNB) 3, though it is not shown in FIG. 1.

The relay UE 2 includes at least one radio transceiver and is configured to perform cellular communication with the base station 3 on a cellular link including an uplink and a downlink (e.g., cellular link 121) in the cellular coverage 31 and perform D2D communication (e.g., ProSe direct discovery and ProSe direct communication) with the remote UE 1 on a D2D link (e.g., D2D link 101).

The base station 3 is an entity disposed in a radio access network (i.e., E-UTRAN), provides the cellular coverage 31 including one or more cells, and is able to communicate with the relay UE 2 on a cellular link (e.g., cellular link 121) by using a cellular communication technology (e.g., E-UTRA technology). Further, the base station 3 is configured to perform cellular communication with the remote UE 1 when it is located within the cellular coverage 31.

FIG. 1 shows three relay scenarios. In the first example, one remote UE 1A is connected to one relay UE 2A. The remote UE 1A transmits data on the D2D link 101 and the relay UE 2A then transmits the data received from the remote UE 1A to the base station 3 on the cellular link 121 (i.e., uplink). In the second example, one remote UE 1B is connected to a plurality of relay UEs 2B and 2C. The remote UE 1B transmits data on two D2D links 102 and 103, and then the relay UEs 2B and 2C transmit the data received from the remote UE 1B to the base station 3 on their cellular links 122 and 123 (i.e., uplinks). In the third example, two remote UEs 1C and 1D are connected to one relay UE 2D. The remote UEs 1C and 1D transmit data on their respective D2D links 104 and 105, and the relay UE 2D transmits the data received from the two remote UEs 1C and 1D to the base station 3 on its cellular link 124 (i.e., uplink). In this embodiment, only one of these three relay scenarios shown in FIG. 1 may be used, or two or all of these three relay scenarios may be used.

In this embodiment, the scheduled resource allocation (i.e., sidelink transmission mode 1) is used for allocation of a radio resource to sidelink transmission. In the case of the scheduled resource allocation, the base station 3 determines a radio resource(s) to be allocated to sidelink transmission from the remote UE 1 to the relay UE 2. For example, the remote UE 1 transmits a scheduling request for requesting an uplink (UL) data transmission resource (i.e., Uplink Shared Channel (UL-SCH) resource) to the base station 3 and transmits a Sidelink BSR to the base station 3 using the UL data transmission resource allocated by an uplink grant (i.e., UL grant). The base station 3 determines a sidelink transmission resource to be allocated to the remote UE 1 based on the Sidelink BSR and transmits a sidelink grant (i.e., an SL grant, or DCI format 5) to the UE. As already described, the sidelink grant designates a radio resource of a PSSCH to be used by a sidelink transmission terminal (i.e., the remote UE 1 in this example) to perform direct transmission.

Figure 2:
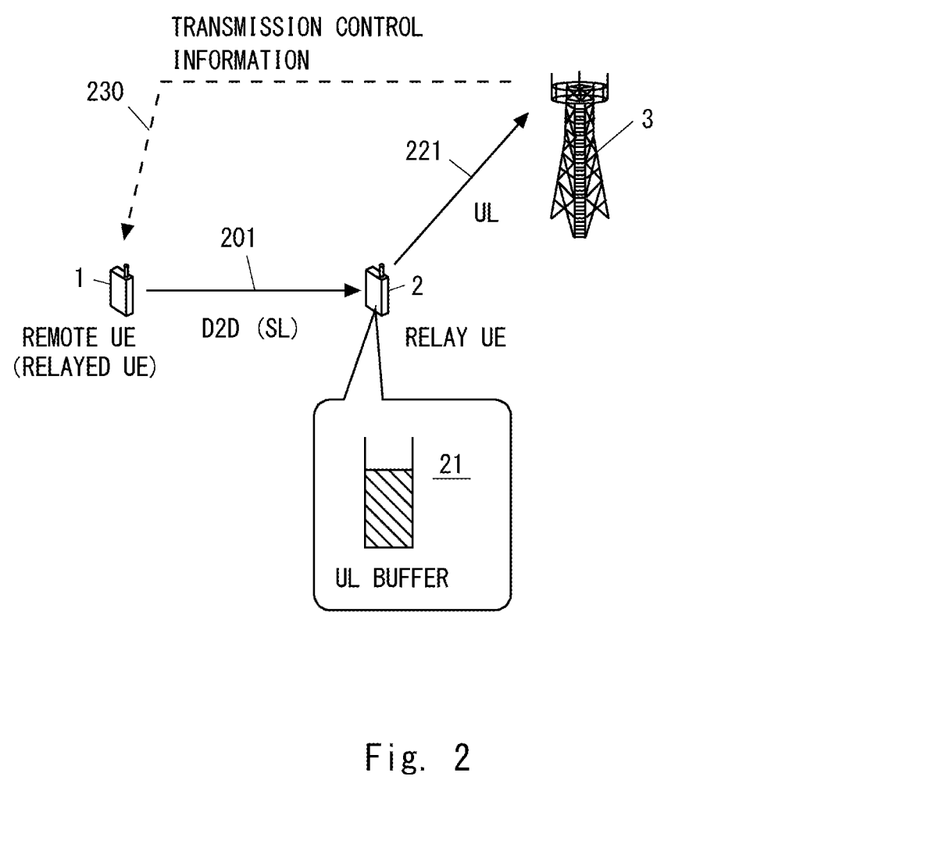
FIG. 2 is a diagram for explaining an outline of sidelink transmission control according to a first embodiment.

Next, an outline of sidelink transmission control according to this embodiment is described hereinafter with reference to FIG. 2. In FIG. 2, the remote UE 1 transmits data to the relay UE 2 on a sidelink 201 and the relay UE 2 transmits the data received from the remote UE 1 to the base station 3 on an uplink 221.

The base station 3 determines a sidelink radio resource to be allocated to sidelink transmission from the remote UE 1 to the relay UE 2 and also determines an uplink radio resource to be allocated to the uplink 221 of the relay UE 2.

In some implementations, the base station 3 may determine the sidelink radio resource to be allocated to the sidelink transmission from the remote UE 1 to the relay UE 2 while considering a quality metric of the uplink from the relay UE 2 to the base station 3. The uplink quality metric of the relay UE 2 is related to performance (e.g., bandwidth or throughput) of uplink transmission from the relay UE 2 to the base station 3. The uplink quality metric of the relay UE 2 is based on, for example, at least one of an estimated bandwidth of the uplink, an estimated throughput of the uplink, an estimated amount of radio resources to be allocated to the uplink, an estimated Modulation and Coding Scheme (MCS) to be applied to the uplink, and an estimated pathloss from the relay UE 2 to the base station 3. The base station 3 may receive the uplink quality metric of the relay UE 2 from the relay UE 2. Alternatively, the base station 3 may estimate the uplink quality metric by itself.

Specifically, the base station 3 may determine a radio resource to be allocated to the sidelink transmission from the remote UE 1 to the relay UE 2 so that performance (e.g., bandwidth or throughput) of this sidelink transmission becomes consistent with performance of the uplink transmission from the relay UE 2 to the base station 3. In other words, the base station 3 may determine a radio resource to be allocated to one or more sidelink transmissions related to one relay UE 2 so that performance (e.g., bandwidth or throughput) of these sidelink transmissions becomes roughly equal to or lower than performance of the uplink transmission of that relay UE 2.

However, a situation where a sidelink reception throughput of the relay UE 2 exceeds an uplink transmission throughput could occur due to some reasons. For example, it is conceivable that an estimated uplink throughput cannot be obtained due to a change in the quality of the uplink 221. In this case, an amount of data buffered in an uplink transmission buffer 21 in the relay UE 2 increases, thus raising a possibility that packets could be discarded due to an overflow in the buffer in the worst case. The uplink transmission buffer 21 is used to store data to be transmitted on the uplink. The uplink transmission buffer 21 stores pending uplink data to be transmitted.

To cope with this problem, the base station 3 according to this embodiment is configured to adjust a bandwidth, throughput, or radio resource used for sidelink transmission (i.e., D2D transmission) from the remote UE 1 to the relay UE 2, based on an amount of pending uplink data in the relay UE to be transmitted from the relay UE to the base station 3.

Figure 3:
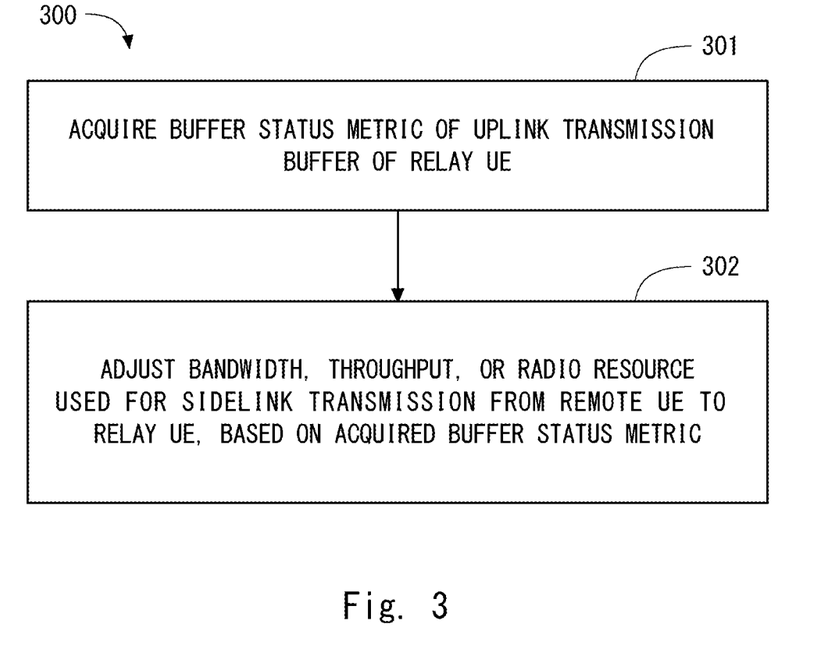
FIG. 3 is a flowchart showing an example of an operation performed by a base station according to the first embodiment.

FIG. 3 is a flowchart showing a process 300 that is an example of an operation performed by the base station 3 according to this embodiment. In step 301, the base station 3 acquires a buffer status metric of the uplink transmission buffer 21 of the relay UE 2. The buffer status metric indicates an amount of pending uplink data in the uplink transmission buffer 21 or an occupation level of the uplink transmission buffer 21.

In some implementations, the base station 3 may receive a buffer status report (or buffer status information) containing the buffer status metric from the relay UE 2. The buffer status report may be transmitted periodically or aperiodically in response to a predetermined trigger event. Alternatively, the base station 3 may calculate the buffer status metric by itself. For example, the base station 3 may calculate the buffer status metric of the uplink transmission buffer 630 in the relay UE 2 based on a history of sidelink radio resources allocated to the remote UE 1 and a history of uplink radio resources allocated to the relay UE 2.

In step 302, the base station 3 adjusts a bandwidth, throughput, or radio resource used for the sidelink transmission from the remote UE 1 to the relay UE 2 based on the acquired buffer status metric. For example, the base station 3 may reduce the bandwidth, throughput, or radio resource used for the sidelink transmission from the remote UE 1 to the relay UE 2 in response to an increase in the amount of pending uplink data in the relay UE 2. Conversely, the base station 3 may increase the bandwidth, throughput, or radio resource used for the sidelink transmission from the remote UE 1 to the relay UE 2 in response to a decrease in the amount of pending uplink data in the relay UE 2.

In some implementations, the base station 3 adjusts the radio resource to be allocated to the sidelink transmission from the remote UE 1 to the relay UE 2 in the scheduled resource allocation. For example, the base station 3 may reduce an amount of radio resources to be allocated to the sidelink transmission from the remote UE 1 to the relay UE 2 when the buffer status metric of the uplink transmission buffer 21 exceeds a predetermined threshold. Specifically, the base station 3 may reduce the radio resources allocated to the sidelink transmission from the remote UE 1 to the relay UE 2 or temporarily suspend the allocation of radio resources to the sidelink transmission in response to an increase in the amount of pending uplink data in the relay UE 2. Alternatively, the base station 3 may lower a priority of the remote UE 1 used for the sidelink radio resource allocation (or scheduling) in response to an increase in the amount of pending uplink data in the relay UE 2. In this way, it is possible to reduce the bandwidth and the throughput of the sidelink transmission from the remote UE 1 to the relay UE 2 and thereby contribute to prevention of an overflow in the uplink transmission buffer 21.

In some implementations, the base station 3 may prevent the remote UE 1 from transmitting a sidelink resource request in response to an increase in the amount of pending uplink data in the relay UE 2. In this way, it is possible to reduce the bandwidth and the throughput of the sidelink transmission from the remote UE 1 to the relay UE 2 and thereby contribute to prevention of an overflow in the uplink transmission buffer 21.

Figure 4:
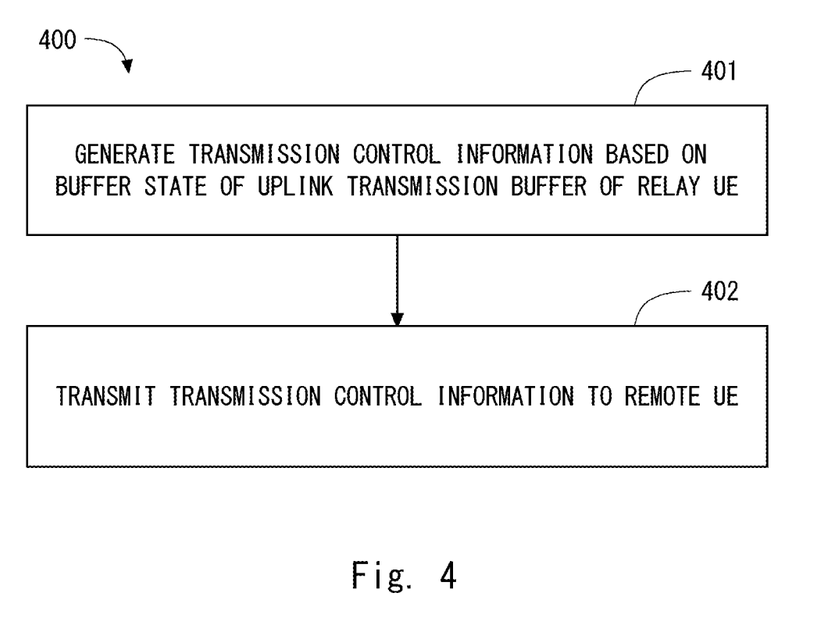
FIG. 4 is a flowchart showing an example of an operation performed by a base station according to the first embodiment.

Specifically, the base station 3 may operate according to an example (a process 400) shown in FIG. 4. In step 401, the base station 3 generates transmission control information 230 based on a buffer status of the uplink transmission buffer 21 of the relay UE 2. In step 402, the base station 3 transmits the transmission control information 230 to the remote UE 1. The base station 3 may transmit the transmission control information 230 periodically, or aperiodically in response to a predetermined trigger event (e.g., when the buffer occupation level exceeds a threshold).

For example, the base station 3 may transmit the transmission control information 230 to the remote UE 1 in response to an increase in the amount of pending uplink data in the relay UE 2. In this case, the transmission control information 230 may instruct the remote UE 1 that the transmission of a sidelink resource request to the base station 3 should be prohibited. Alternatively, the transmission control information 230 may indicate the buffer status metric related to the uplink transmission buffer 21 of the relay UE 2. The transmission control information 230 can also be referred to as a pause signal.

Second Embodiment

This embodiment provides a modified example of the sidelink transmission control described in the first embodiment. A configuration example of a radio communication network according to this embodiment is similar to that in FIG. 1.

The transmission control information 230 described in the first embodiment may be transmitted from the relay UE 2 to the remote UE 1, instead of being transmitted from the base station 3. That is, the relay UE 2 may generate transmission control information 230 based on a buffer status of the uplink transmission buffer 21 and transmit the generated transmission control information 230 periodically, or aperiodically in response to a predetermined trigger event (e.g., when the buffer occupation level exceeds a threshold). The transmission control information 230 may be transmitted in response to an increase in the amount of pending uplink data in the uplink transmission buffer 21. In this case, the transmission control information 230 may trigger the remote UE 1 to (a) reduce radio resources used for the sidelink transmission from the remote UE 1 to the relay UE 2, (b) temporarily suspend the sidelink transmission, or (c) prevent transmission of a sidelink resource request to the base station 3.

By the above-described operation, it is also possible to reduce the bandwidth and the throughput of the sidelink transmission from the remote UE 1 to the relay UE 2 and thereby contribute to prevention of an overflow in the uplink transmission buffer 21.

Third Embodiment

This embodiment provides a modified example of the sidelink transmission control described in the first embodiment. A configuration example of a radio communication network according to this embodiment is similar to that in FIG. 1.

In this embodiment, the autonomous resource selection (i.e., sidelink transmission mode 2) is used for allocation of a radio resource to sidelink transmissions. In the case of the autonomous resource selection, the base station 3 notifies a sidelink transmission terminal (i.e., the remote UE 1 in this example) of a radio resource pool (i.e., PSSCH subframe pool and resource block pool) that is permitted to be used for direct transmission, via an SIB 18 or dedicated signaling (RRC signaling). The sidelink transmission terminal (i.e., the remote UE 1) autonomously selects resources for sidelink control (i.e., PSCCH) and data (i.e., PSSCH) from the radio resource pool that has been set by the base station 3.

Figure 5:
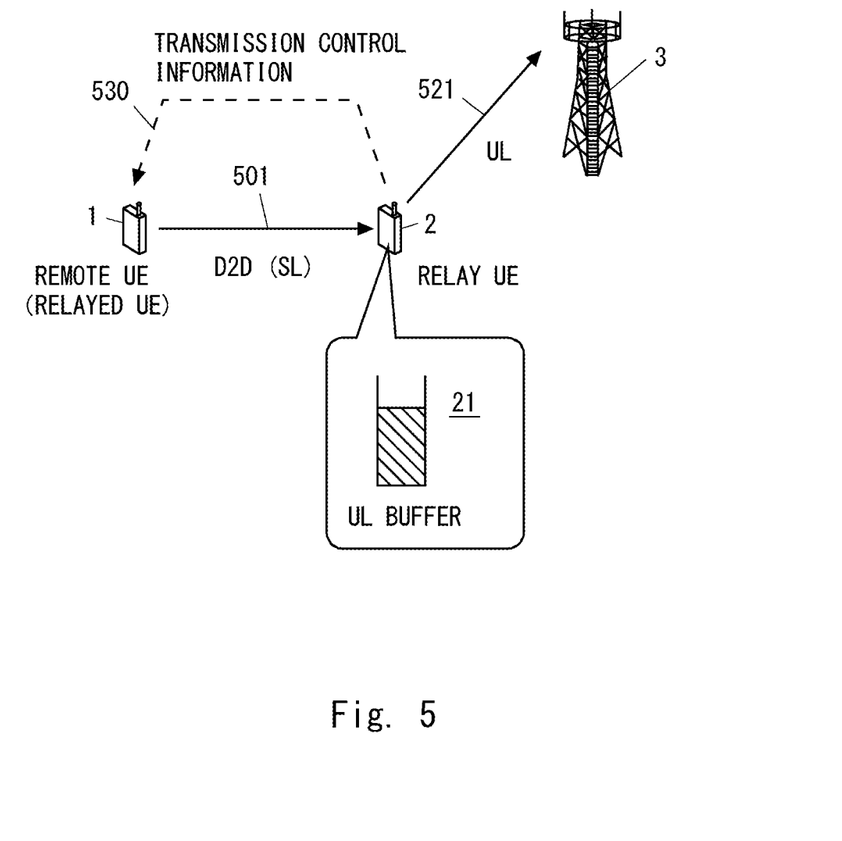
FIG. 5 is a diagram for explaining an outline of sidelink transmission control according to a third embodiment.

An outline of sidelink transmission control according to this embodiment is described hereinafter with reference to FIG. 5. In FIG. 5, the remote UE 1 selects a radio resource for sidelink transmission from a radio resource pool and transmits data to the relay UE 2 on a sidelink 501 by using the selected radio resource. The relay UE 2 transmits the data received from the remote UE 1 to the base station 3 on an uplink 521.

As described above with reference to FIG. 3, a situation where a sidelink reception throughput of the relay UE 2 exceeds an uplink transmission throughput could occur due to some reasons. In this case, an amount of data buffered in an uplink transmission buffer 21 in the relay UE 2 increases, thus raising a possibility that packets could be discarded due to an overflow in the buffer in the worst case. The uplink transmission buffer 21 is used to store data to be transmitted on the uplink. The uplink transmission buffer 21 stores pending uplink data to be transmitted.

To cope with this problem, the remote UE 1 according to this embodiment is configured to adjust a bandwidth, throughput, or radio resource used for sidelink transmission (i.e., D2D transmission) from the remote UE 1 to the relay UE 2 based on an amount of pending uplink data in the relay UE 2 to be transmitted from the relay UE to the base station 3. Specifically, the remote UE 1 receives transmission control information 530 from the relay UE 2 and adjusts a sidelink bandwidth, throughput, or radio resource based on the received transmission control information 530. Note that the transmission control information 530 is generated based on a buffer status of the uplink transmission buffer 21 of the relay UE 2.

Figure 6:
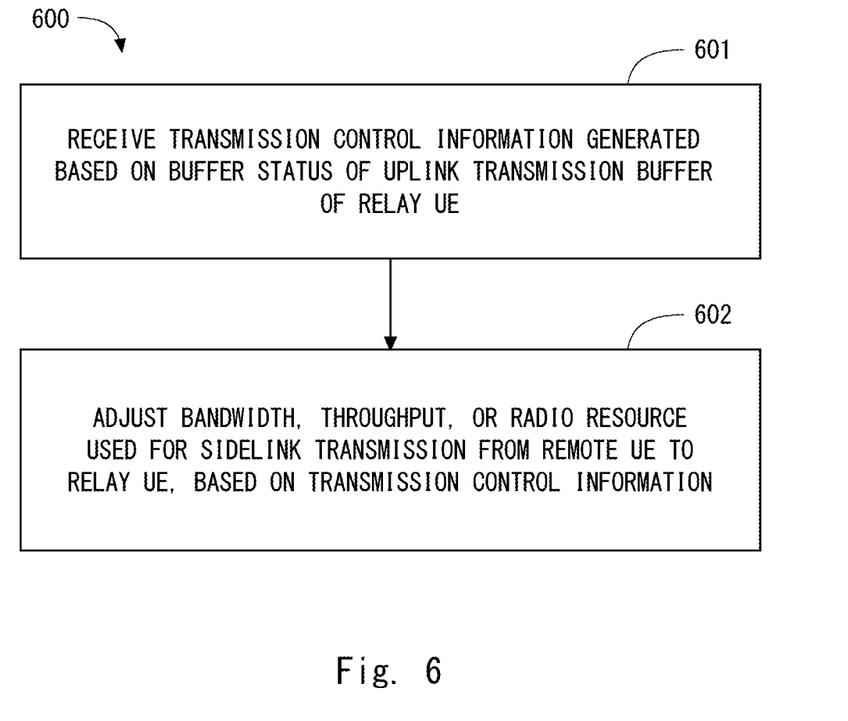
FIG. 6 is a flowchart showing an example of a remote terminal according to the third embodiment.

FIG. 6 is a flowchart showing a process 600 that is an example of an operation performed by the remote UE 1 according to this embodiment. In step 601, the remote UE 1 receives transmission control information 530 generated based on a buffer status of the uplink transmission buffer 21 of the relay UE 2.

In step 602, the remote UE 1 adjusts a bandwidth, throughput, or radio resource used for sidelink transmission from the remote UE 1 to the relay UE 2 based on the received transmission control information 530. For example, the remote UE 1 may reduce the bandwidth, throughput, or radio resource used for the sidelink transmission from the remote UE 1 to the relay UE 2 in response to an increase in the amount of pending uplink data in the relay UE 2. Conversely, the remote UE 1 may increase the bandwidth, throughput, or radio resource used for the sidelink transmission from the remote UE 1 to the relay UE 2 in response to a decrease in the amount of pending uplink data in the relay UE 2.

Figure 7:
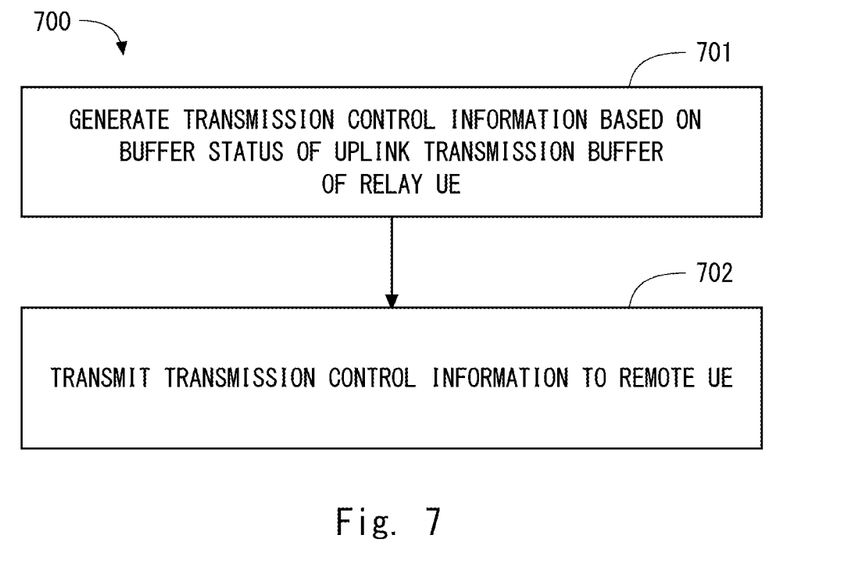
FIG. 7 is a flowchart showing an example of an operation performed by a relay terminal according to the third embodiment.

FIG. 7 is a flowchart showing a process 700 that is an example of an operation performed by the relay UE 2 according to this embodiment. In step 701, the relay UE 2 generates transmission control information 530 based on a buffer status of the uplink transmission buffer 21. In step 702, the relay UE 2 transmits the generated transmission control information 530 to the remote UE 1.

In some implementations, the transmission control information 530 may indicate a buffer status metric related to the uplink transmission buffer 21 of the relay UE 2. In this case, the remote UE 1 may determine an estimated bandwidth or throughput of the uplink from the relay UE 2 to the base station 3 based on the transmission control information 530 (i.e., the buffer status metric) and adjust the bandwidth, throughput, or radio resource while considering the determined estimated uplink bandwidth or throughput. For example, the remote UE 1 may determine a radio resource to be allocated to sidelink transmission so that the sidelink bandwidth or throughput becomes roughly equal to or smaller than the estimated uplink bandwidth or throughput. In this way, it is possible to reduce the bandwidth and the throughput of the sidelink transmission from the remote UE 1 to the relay UE 2 and thereby contribute to prevention of an overflow in the uplink transmission buffer 21.

In other implementations, the transmission control information 530 may be transmitted in response to an increase in the amount of pending uplink data in the relay UE 2. The transmission control information 530 may request the remote UE 1 to reduce the sidelink bandwidth, throughput, or radio resource. Alternatively, the transmission control information 530 may indicate a buffer status metric related to the uplink transmission buffer 21. The transmission control information 530 may trigger the remote UE 1 to (a) reduce radio resources used for sidelink transmission from the remote UE 1 to the relay UE 2 or (b) temporarily suspend the sidelink transmission. In this case, the transmission control information 530 can also be referred to as a pause signal. In this way, it is possible to reduce the bandwidth and the throughput of the sidelink transmission from the remote UE 1 to the relay UE 2 and thereby contribute to prevention of an overflow in the uplink transmission buffer 21.

Fourth Embodiment

This embodiment provides a modified example of the sidelink transmission control described in the second embodiment. A configuration example of a radio communication network according to this embodiment is similar to that in FIG. 1.

The transmission control information 530 described in the second embodiment may be transmitted from the base station 3 to the remote UE 1, instead being transmitted from the relay UE 2. That is, the base station 3 may generate transmission control information 530 based on a buffer status of the uplink transmission buffer 21 and transmit the generated transmission control information 530 periodically, or aperiodically in response to a predetermined trigger event (e.g., when the buffer occupation level exceeds a threshold). Alternatively, the base station 3 may receive the transmission control information 530 from the relay UE 2 and forward the transmission control information 530 received from the relay UE 2 to the remote UE 1.

By the above-described operation, it is also possible to reduce the bandwidth and the throughput of the sidelink transmission from the remote UE 1 to the relay UE 2 and thereby contribute to prevention of an overflow in the uplink transmission buffer 21.

Figure 8:
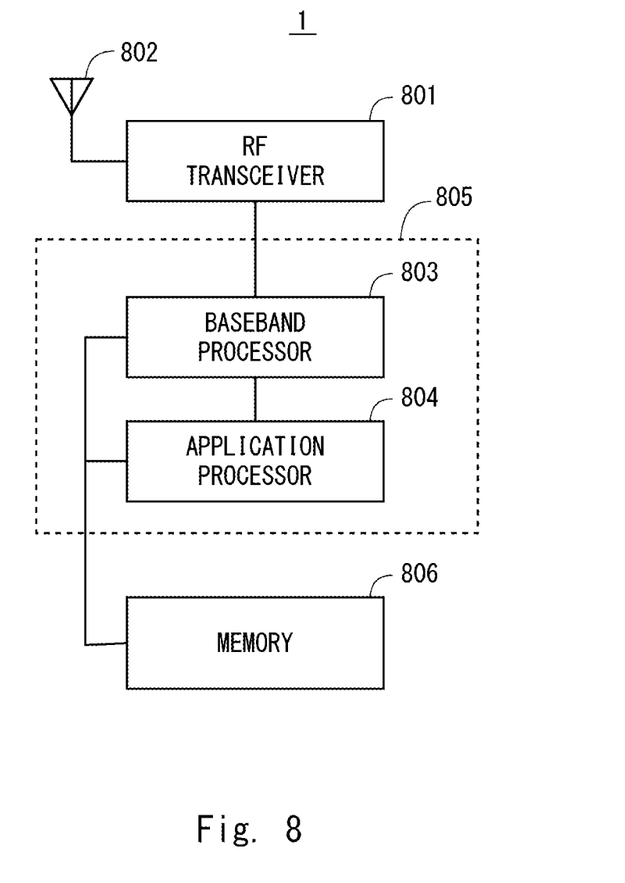
FIG. 8 is a block diagram showing a configuration example of a radio terminal according to some embodiments.

Lastly, configuration examples of the remote UE 1, the relay UE 2, and the base station 3 according to the above embodiments will be described. FIG. 8 is a block diagram showing a configuration example of the remote UE 1. The relay UE 2 may have a configuration similar to that shown in FIG. 8. A Radio Frequency (RF) transceiver 801 performs an analog RF signal processing to communicate with the base station 3. The analog RF signal processing performed by the RF transceiver 801 includes a frequency up-conversion, a frequency down-conversion, and amplification. The RF transceiver 801 is coupled to an antenna 802 and a baseband processor 803. That is, the RF transceiver 801 receives modulated symbol data (or OFDM symbol data) from the baseband processor 803, generates a transmission RF signal, and supplies the generated transmission RF signal to the antenna 802. Further, the RF transceiver 801 generates a baseband reception signal based on a reception RF signal received by the antenna 802 and supplies the generated baseband reception signal to the baseband processor 803.

The RF transceiver 801 may also be used for sidelink communication with other UEs. The RF transceiver 801 may include a plurality of transceivers.

The baseband processor 803 performs digital baseband signal processing (i.e., data-plane processing) and control-plane processing for radio communication. The digital baseband signal processing includes (a) data compression/decompression, (b) data segmentation/concatenation, (c) composition/decomposition of a transmission format (i.e., transmission frame), (d) channel coding/decoding, (e) modulation (i.e., symbol mapping)/demodulation, and (f) generation of OFDM symbol data (i.e., baseband OFDM signal) by Inverse Fast Fourier Transform (IFFT). On the other hand, the control-plane processing includes communication management of layer 1 (e.g., transmission power control), layer 2 (e.g., radio resource management and hybrid automatic repeat request (HARQ) processing), and layer 3 (e.g., signaling regarding attach, mobility, and call management).

For example, in the case of LTE or LTE-Advanced, the digital baseband signal processing performed by the baseband processor 803 may include signal processing of Packet Data Convergence Protocol (PDCP) layer, Radio Link Control (RLC) layer, MAC layer, and PHY layer. Further, the control-plane processing performed by the baseband processor 803 may include processing of Non-Access Stratum (NAS) protocol, RRC protocol, and MAC CE.

The baseband processor 803 may include a modem processor (e.g., Digital Signal Processor (DSP)) that performs the digital baseband signal processing and a protocol stack processor (e.g., Central Processing Unit (CPU) or a Micro Processing Unit (MPU)) that performs the control-plane processing. In this case, the protocol stack processor, which performs the control-plane processing, may be integrated with an application processor 804 described in the following.

The application processor 804 may also be referred to as a CPU, an MPU, a microprocessor, or a processor core. The application processor 804 may include a plurality of processors (processor cores). The application processor 804 loads a system software program (Operating System (OS)) and various application programs (e.g., voice call application, WEB browser, mailer, camera operation application, and music player application) from a memory 806 or from another memory (not shown) and executes these programs, thereby providing various functions of the remote UE 1.

In some implementations, as represented by a dashed line (805) in FIG. 8, the baseband processor 803 and the application processor 804 may be integrated on a single chip. In other words, the baseband processor 803 and the application processor 804 may be implemented in a single System on Chip (SoC) device 805. A SoC device may be referred to as a system Large Scale Integration (LSI) or a chipset.

The memory 806 is a volatile memory, a nonvolatile memory, or a combination thereof. The memory 806 may include a plurality of memory devices that are physically independent from each other. The volatile memory is, for example, a Static Random Access Memory (SRAM), a Dynamic RAM (DRAM), or a combination thereof. The non-volatile memory is, for example, a mask Read Only Memory (MROM), an Electrically Erasable Programmable ROM (EEPROM), a flash memory, a hard disc drive, or any combination thereof. The memory 806 may include, for example, an external memory device that can be accessed by the baseband processor 803, the application processor 804, and the SoC 805. The memory 806 may include an internal memory device that is integrated in the baseband processor 803, the application processor 804, or the SoC 805. Further, the memory 806 may include a memory in a Universal Integrated Circuit Card (UICC).

The memory 806 may store software modules (computer programs) including instructions and data to perform processing by the remote UE 1 described in the aforementioned plurality of embodiments. In some implementations, the baseband processor 803 or the application processor 804 may be configured to load these software modules from the memory 806 and execute the loaded software modules, thereby performing the processing of the remote UE 1 described in the above embodiments with reference to the drawings.

Figure 9:
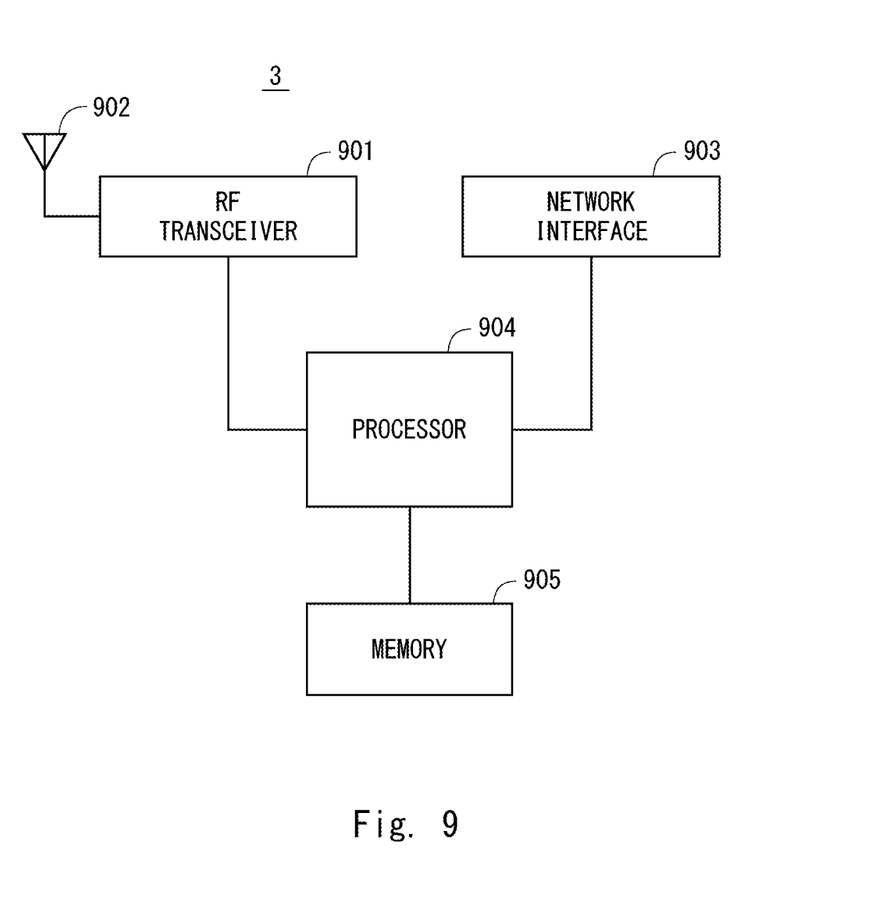
FIG. 9 is a block diagram showing a configuration example of a base station according to some embodiments.

FIG. 9 is a block diagram showing a configuration example of the base station 3 according to the above-described embodiments. As shown in FIG. 9, the base station 3 includes an RF transceiver 901, a network interface 903, a processor 904, and a memory 905. The RF transceiver 901 performs analog RF signal processing to communicate with the remote UE 1 and the relay UE 2. The RF transceiver 901 may include a plurality of transceivers. The RF transceiver 901 is connected to an antenna 902 and the processor 904. The RF transceiver 901 receives modulated symbol data (or OFDM symbol data) from the processor 904, generates a transmission RF signal, and supplies the generated transmission RF signal to the antenna 902. Further, the RF transceiver 901 generates a baseband reception signal based on a reception RF signal received by the antenna 902 and supplies this signal to the processor 904.

The network interface 903 is used to communicate with a network node (e.g., Mobility Management Entity (MME) and Serving Gateway (S-GW)). The network interface 903 may include, for example, a network interface card (NIC) conforming to the IEEE 802.3 series.

The processor 904 performs digital baseband signal processing (data-plane processing) and control-plane processing for radio communication. For example, in the case of LTE or LTE-Advanced, the digital baseband signal processing performed by the processor 904 may include signal processing of the PDCP layer, RLC layer, MAC layer, and PHY layer. Further, the control-plane processing performed by the processor 904 may include processing of S1 protocol, RRC protocol, and MAC CE.

The processor 904 may include a plurality of processors. For example, the processor 904 may include a modem-processor (e.g., DSP) that performs the digital baseband signal processing, and a protocol-stack-processor (e.g., CPU or MPU) that performs the control-plane processing.

The memory 905 is composed of a combination of a volatile memory and a nonvolatile memory. The volatile memory is, for example, an SRAM, a DRAM, or a combination thereof. The nonvolatile memory is, for example, an MROM, a PROM, a flash memory, a hard disk drive, or a combination thereof. The memory 905 may include a storage located apart from the processor 904. In this case, the processor 904 may access the memory 905 through the network interface 903 or an I/O interface (not shown).

The memory 905 may store software modules (computer programs) including instructions and data to perform processing by the base station 3 described in the aforementioned plurality of embodiments. In some implementations, the processor 904 may be configured to load these software modules from the memory 905 and execute the loaded software modules, thereby performing the processing of the base station 3 described in the above embodiments with reference to the drawings.

As described above with reference to FIGS. 8 and 9, each of the processors included in the remote UE 1, the relay UE 2, and the base station 3 in the above embodiments executes one or more programs including a set of instructions to cause a computer to perform an algorithm described above with reference to the drawings. These programs may be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a Compact Disc Read Only Memory (CD-ROM), CD-R, CD-R/W, and a semiconductor memory (such as a mask ROM, a Programmable ROM (PROM), an Erasable PROM (EPROM), a flash ROM, and a Random Access Memory (RAM)). These programs may be supplied to computers by using various types of transitory computer readable media. Examples of the transitory computer readable media include an electrical signal, an optical signal, and an electromagnetic wave. The transitory computer readable media can be used to supply programs to a computer through a wired communication line (e.g., electric wires and optical fibers) or a wireless communication line.

Other Embodiments

Each of the above embodiments may be used individually, or two or more of the embodiments may be appropriately combined with one another.

The processes and operations, including the sidelink radio resource allocation, performed by the base station 3 described in the above embodiments may be provided by a Digital Unit (DU), or by a combination of the DU and a Radio Unit (RU), included in a Cloud Radio Access Network (C-RAN) architecture. The DU is also referred to as a Baseband Unit (BBU). The RU is also referred to as a Remote Radio Head (RRH) or Remote Radio Equipment (RRE). That is, the processes and operations performed by the base station 3 described in the above embodiments may be provided by one or a plurality of radio stations (i.e., RAN nodes).

Further, the above-described embodiments are merely examples of applications of the technical ideas obtained by the inventors. These technical ideas are not limited to the above-described embodiments and various modifications can be made thereto.

For example, the whole or part of the embodiments disclosed above can be described as, but not limited to, the following supplementary notes.

(Supplementary Note 1)
An apparatus for controlling device-to-device communication, comprising:
a memory; and
at least one processor coupled to the memory and configured to adjust a bandwidth, throughput, or radio resource used for device-to-device (D2D) transmission from a remote terminal to a relay terminal based on an amount of pending uplink data in the relay terminal to be transmitted from the relay terminal to a base station.

(Supplementary Note 2)
The apparatus described in Supplementary note 1, wherein the at least one processor is configured to receive buffer status information indicating a buffer status metric related to an amount of data in an uplink transmission buffer of the relay terminal or an occupation level of the uplink transmission buffer and adjust the bandwidth, the throughput, or the radio resource based on the buffer status information.

(Supplementary Note 3)
The apparatus described in Supplementary note 2, wherein the at least one processor is configured to determine an estimated bandwidth or estimated throughput of an uplink from the relay terminal to the base station based on the buffer status information and adjust the bandwidth, the throughput, or the radio resource used for the D2D transmission while considering the estimated bandwidth or the estimated throughput.

(Supplementary Note 4)
The apparatus described in any one of Supplementary notes 1 to 3, wherein the at least one processor is configured to reduce the bandwidth, the throughput, or the radio resource used for the D2D transmission in response to an increase in the amount of the pending uplink data.

(Supplementary Note 5)
The apparatus described in any one of Supplementary notes 1 to 4, wherein the apparatus is implemented in the remote terminal.

(Supplementary Note 6)
The apparatus described in Supplementary note 5, wherein the at least one processor is configured to, in response to an increase in the amount of the pending uplink data, (a) reduce a radio resource used for the D2D transmission from the remote terminal to the relay terminal, (b) temporarily suspend the D2D transmission, or (c) prevent transmission of a D2D resource request to the base station.

(Supplementary Note 7)
The apparatus described in any one of Supplementary notes 1 to 4, wherein the apparatus is implemented in the base station.

(Supplementary Note 8)
The apparatus described in Supplementary note 7, wherein the at least one processor is configured to, in response to an increase in the amount of the pending uplink data, (a) reduce a radio resource to be allocated to D2D transmission from the remote terminal to the relay terminal, (b) temporarily suspend allocation of the radio resource to the D2D transmission, (c) lower a priority of the relay terminal used for D2D radio resource allocation, or (d) prevent transmission of a D2D resource request by the relay terminal.

(Supplementary Note 9)

A method for controlling device-to-device communication, the method comprising adjusting a bandwidth, throughput, or radio resource used for device-to-device (D2D) transmission from a remote terminal to a relay terminal based on an amount of pending uplink data in the relay terminal to be transmitted from the relay terminal to a base station.

(Supplementary Note 10)

A program for causing a computer to perform a method for controlling device-to-device communication, wherein the method comprises adjusting a bandwidth, throughput, or radio resource used for device-to-device (D2D) transmission from a remote terminal to a relay terminal based on an amount of pending uplink data in the relay terminal to be transmitted from the relay terminal to a base station.

(Supplementary Note 11)

A base station comprising:
a memory; and
at least one processor coupled to the memory and configured to transmit, to a remote terminal, control information generated based on a buffer status of an uplink transmission buffer, the uplink transmission buffer being configured to store pending uplink data in a relay terminal to be transmitted from the relay terminal to the base station.

(Supplementary Note 12)

The base station described in Supplementary note 11, wherein the control information is used by the remote terminal to adjust a bandwidth, throughput, or radio resource used for D2D transmission from the remote terminal to the relay terminal.

(Supplementary Note 13)

The base station described in Supplementary note 11 or 12, wherein the control information indicates a buffer status metric related to an amount of the pending uplink data or an occupation level of the uplink transmission buffer.

(Supplementary Note 14)

The base station described in any one of Supplementary notes 11 to 13, wherein
the control information is transmitted in response to an increase in the amount of the pending uplink data, and
the control information triggers the remote terminal to (a) reduce a radio resource used for D2D transmission from the remote terminal to the relay terminal, (b) temporarily suspend the D2D transmission, or (c) prevent transmission of a D2D resource request to the base station.

(Supplementary Note 15)

The base station described in any one of Supplementary notes 11 to 13, wherein the control information indicates that the base station refuses allocation of a radio resource to D2D transmission from the remote terminal to the relay terminal.

(Supplementary Note 16)

A method performed in a base station, the method comprising:
acquiring a buffer status of an uplink transmission buffer, the uplink transmission buffer being configured to store pending uplink data in a relay terminal to be transmitted from the relay terminal to the base station; and
transmitting, to a remote terminal, control information generated based on the buffer status.

(Supplementary Note 17)

A program for causing a computer to perform a method performed in a base station, wherein the method comprises:
acquiring a buffer status of an uplink transmission buffer, the uplink transmission buffer being configured to store pending uplink data in a relay terminal to be transmitted from the relay terminal to the base station; and
transmitting, to a remote terminal, device-to-device (D2D) control information generated based on the buffer status.

(Supplementary Note 18)

A relay terminal comprising:
a memory; and
at least one processor coupled to the memory and configured to transmit, to a remote terminal, control information generated based on a buffer status of an uplink transmission buffer, the uplink transmission buffer being configured to store pending uplink data in the relay terminal to be transmitted from the relay terminal to a base station.

(Supplementary Note 19)

The relay terminal described in Supplementary note 18, wherein the control information is used by the remote terminal to adjust a bandwidth, throughput, or radio resource used for D2D transmission from the remote terminal to the relay terminal.

(Supplementary Note 20)

The relay terminal described in Supplementary note 18 or 19, wherein the control information indicates a buffer status metric related to an amount of the pending uplink data or an occupation level of the uplink transmission buffer.

(Supplementary Note 21)

The relay terminal described in any one of Supplementary notes 18 to 20, wherein
the control information is transmitted in response to an increase in the amount of the pending uplink data, and
the control information triggers the remote terminal to (a) reduce a radio resource used for D2D transmission from the remote terminal to the relay terminal, (b) temporarily suspend the D2D transmission, or (c) prevent transmission of a D2D resource request to the base station.

(Supplementary Note 22)

The relay terminal described in any one of Supplementary notes 18 to 21, wherein the at least one processor is configured to transmit the control information to the remote terminal on a D2D link.

(Supplementary Note 23)

A method performed in a relay terminal, the method comprising:
acquiring a buffer status of an uplink transmission buffer configured to store pending uplink data in the relay terminal to be transmitted from the relay terminal to a base station; and
transmitting, to a remote terminal, control information generated based on the buffer status.

(Supplementary Note 24)

A program for causing a computer to perform a method performed in a relay terminal, wherein the method comprises:
acquiring a buffer status of an uplink transmission buffer configured to store pending uplink data in the relay terminal to be transmitted from the relay terminal to a base station; and
transmitting, to a remote terminal, control information generated based on the buffer status.

(Supplementary Note 25)

A remote terminal comprising:
a memory; and
at least one processor coupled to the memory, wherein the at least one processor is configured to receive, from a remote terminal or a base station, control information generated based on a buffer status of an uplink transmission buffer, the uplink transmission buffer being configured to store pending uplink data in the relay terminal to be transmitted from the relay terminal to the base station.

(Supplementary Note 26)

The remote terminal described in Supplementary note 25, wherein the at least one processor is configured to adjust a bandwidth, throughput, or radio resource used for D2D transmission from the remote terminal to the relay terminal based on the control information.

(Supplementary Note 27)

The remote terminal described in Supplementary note 25 or 26, wherein the control information indicates a buffer status metric related to an amount of the pending uplink data or an occupation level of the uplink transmission buffer.

(Supplementary Note 28)

The remote terminal described in Supplementary note 27, wherein the at least one processor is configured to determine an estimated bandwidth or estimated throughput of an uplink from the relay terminal to the base station based on the control information and adjust a bandwidth, throughput, or radio resource used for the D2D transmission while considering the estimated bandwidth or the estimated throughput.

(Supplementary Note 29)

The remote terminal described in any one of Supplementary notes 25 to 27, wherein the control information is transmitted in response to an increase in the amount of the pending uplink data, and the control information triggers the remote terminal to (a) reduce a radio resource used for D2D transmission from the remote terminal to the relay terminal, (b) temporarily suspend the D2D transmission, or (c) prevent transmission of a D2D resource request to the base station.

(Supplementary Note 30)

The remote terminal described in any one of Supplementary notes 25 to 29, wherein the at least one processor is configured to receive the control information from the relay terminal on a D2D link.

(Supplementary Note 31)

A method performed in a remote terminal, the method comprising receiving, from a remote terminal or a base station, control information generated based on a buffer status of an uplink transmission buffer, the uplink transmission buffer being configured to store pending uplink data in the relay terminal to be transmitted from the relay terminal to the base station.

(Supplementary Note 32)

The method described in Supplementary note 31, further comprising adjusting a bandwidth, throughput, or radio resource used for D2D transmission from the remote terminal to the relay terminal.

(Supplementary Note 33)

A program for causing a computer to perform a method performed in a remote terminal, wherein the method comprises receiving, from a remote terminal or a base station, control information generated based on a buffer status of an uplink transmission buffer from the remote terminal or a base station, the uplink transmission buffer being configured to store pending uplink data in the relay terminal to be transmitted from the relay terminal to the base station.

REFERENCE SIGNS LIST

1 REMOTE UE
2 RELAY UE
3 BASE STATION
21 UPLINK TRANSMISSION BUFFER
801 RADIO FREQUENCY (RF) TRANSCEIVER
803 BASEBAND PROCESSOR
804 APPLICATION PROCESSOR
806 MEMORY
904 PROCESSOR
905 MEMORY

The invention claimed is:

1. An apparatus for controlling device-to-device communication, comprising:
   a memory; and
   at least one processor coupled to the memory and configured to adjust a bandwidth, throughput, or radio resource used for device-to-device (D2D) transmission from a remote terminal to a relay terminal, based on an amount of pending uplink data in the relay terminal to be transmitted from the relay terminal to a base station.

2. The apparatus according to claim 1, wherein the at least one processor is configured to receive buffer status information indicating a buffer status metric related to an amount of data in an uplink transmission buffer of the relay terminal or an occupation level of the uplink transmission buffer and adjust the bandwidth, the throughput, or the radio resource based on the buffer status information.

3. The apparatus according to claim 2, wherein the at least one processor is configured to determine an estimated bandwidth or estimated throughput of an uplink from the relay terminal to the base station based on the buffer status information and adjust the bandwidth, the throughput, or the radio resource used for the D2D transmission while considering the estimated bandwidth or the estimated throughput.

4. The apparatus according to claim 1, wherein the at least one processor is configured to reduce the bandwidth, the throughput, or the radio resource used for the D2D transmission in response to an increase in the amount of the pending uplink data.

5. The apparatus according to claim 1, wherein the apparatus is implemented in the remote terminal.

6. The apparatus according to claim 5, wherein the at least one processor is configured to, in response to an increase in the amount of the pending uplink data, (a) reduce a radio resource used for the D2D transmission from the remote terminal to the relay terminal, (b) temporarily suspend the D2D transmission, or (c) prevent transmission of a D2D resource request to the base station.

7. The apparatus according to claim 1, wherein the apparatus is implemented in the base station.

8. The apparatus according to claim 7, wherein the at least one processor is configured to, in response to an increase in the amount of the pending uplink data, (a) reduce a radio resource to be allocated to the D2D transmission from the remote terminal to the relay terminal, (b) temporarily suspend allocation of the radio resource to the D2D transmission, (c) lower a priority of the relay terminal used for D2D radio resource allocation, or (d) prevent transmission of a D2D resource request by the relay terminal.

9. A method for controlling device-to-device communication, the method comprising adjusting a bandwidth, throughput, or radio resource used for device-to-device (D2D) transmission from a remote terminal to a relay terminal, based on an amount of pending uplink data in the relay terminal to be transmitted from the relay terminal to a base station.

10. A remote terminal comprising:
    a memory; and
    at least one processor coupled to the memory, wherein the at least one processor is configured to receive, from a relay terminal or a base station, control information generated based on a buffer status of an uplink transmission buffer, the uplink transmission buffer being configured to store pending uplink data in the relay terminal to be transmitted from the relay terminal to the base station.

11. The remote terminal according to claim 10, wherein the at least one processor is configured to adjust a bandwidth, throughput, or radio resource used for D2D transmission from the remote terminal to the relay terminal based on the control information.

12. The remote terminal according to claim 10, wherein the control information indicates a buffer status metric related to an amount of the pending uplink data or an occupation level of the uplink transmission buffer.

13. The remote terminal according to claim 12, wherein the at least one processor is configured to determine an estimated bandwidth or estimated throughput of an uplink from the relay terminal to the base station based on the control information and adjust a bandwidth, throughput, or radio resource used for the D2D transmission while considering the estimated bandwidth or the estimated throughput.

14. The remote terminal according to claim 10, wherein
 the control information is transmitted in response to an increase in the amount of the pending uplink data, and
 the control information triggers the remote terminal to (a) reduce a radio resource used for D2D transmission from the remote terminal to the relay terminal, (b) temporarily suspend the D2D transmission, or (c) prevent transmission of a D2D resource request to the base station.

15. The remote terminal according to claim 10, wherein the at least one processor is configured to receive the control information from the relay terminal on a D2D link.

* * * * *